(12) United States Patent
Yasukagawa

(10) Patent No.: US 10,305,130 B2
(45) Date of Patent: May 28, 2019

(54) TANK-TYPE POWER GENERATION DEVICE CAPABLE OF MANUFACTURING HIGH-PRESSURE HYDROGEN AND FUEL CELL VEHICLE

(71) Applicant: KABUSHIKI KAISHA SENRYOU, Toyama-shi, Toyama (JP)

(72) Inventor: Makoto Yasukagawa, Natori (JP)

(73) Assignee: KABUSHIKI KAISHA SENRYOU, Toyama (JP)

( * ) Notice: Subject to any disclaimer, the term of this patent is extended or adjusted under 35 U.S.C. 154(b) by 0 days.

(21) Appl. No.: 15/736,275

(22) PCT Filed: Jun. 1, 2016

(86) PCT No.: PCT/JP2016/066121
§ 371 (c)(1),
(2) Date: Dec. 13, 2017

(87) PCT Pub. No.: WO2017/022313
PCT Pub. Date: Feb. 9, 2017

(65) Prior Publication Data
US 2018/0175423 A1 Jun. 21, 2018

(30) Foreign Application Priority Data
Aug. 5, 2015 (JP) .................. 2015-154798

(51) Int. Cl.
*H01M 8/0656* (2016.01)
*C25B 15/08* (2006.01)
(Continued)

(52) U.S. Cl.
CPC ....... *H01M 8/0656* (2013.01); *B60L 11/1883* (2013.01); *B60L 11/1898* (2013.01);
(Continued)

(58) Field of Classification Search
CPC .......... H01M 8/0656; H01M 8/04201; H01M 8/04753; H01M 8/1018; H01M 2250/20;
(Continued)

(56) References Cited

U.S. PATENT DOCUMENTS

2005/0064281 A1* 3/2005 Ophardt ............ H01M 8/04186
429/127

FOREIGN PATENT DOCUMENTS

JP 2008-251513 A 10/2008
JP 2011-113728 A 6/2011
(Continued)

OTHER PUBLICATIONS

Sep. 20, 2016 International Search Report issued in International Patent Application No. PCT/JP2016/066121.
(Continued)

*Primary Examiner* — Gary D Harris
(74) *Attorney, Agent, or Firm* — Oliff PLC

(57) ABSTRACT

A tank-type power generation device capable of manufacturing high-pressure hydrogen installed in a fuel cell vehicle, which utilizes the hydrogen in order to generate power and can reduce the manufacturing cost of the vehicle without need for a separate fuel cell, and a fuel cell vehicle. A partition member partitions the interior of a tank main body into two sections, and includes a solid polymer electrolyte membrane in contact with the individual sections. A supply means can switch water and a gas containing oxygen to supply it to one section. An electrolytic power generation means includes electrodes on both membrane surfaces and when the water is supplied by the supply means, it can perform electrolysis by applying a voltage between the electrodes to store hydrogen gas in one section and when the gas containing oxygen is supplied, it can generate power by reacting the gas with the hydrogen gas.

5 Claims, 2 Drawing Sheets

(51) Int. Cl.
*C25B 1/12* (2006.01)
*C25B 9/00* (2006.01)
*B60L 11/18* (2006.01)
*H01M 8/04746* (2016.01)
*H01M 8/1018* (2016.01)
*H01M 8/04082* (2016.01)

(52) U.S. Cl.
CPC .................. *C25B 1/12* (2013.01); *C25B 9/00* (2013.01); *C25B 15/08* (2013.01); *H01M 8/04201* (2013.01); *H01M 8/04753* (2013.01); *H01M 8/1018* (2013.01); *H01M 2008/1095* (2013.01); *H01M 2250/20* (2013.01); *H01M 2300/0082* (2013.01); *Y02E 60/366* (2013.01); *Y02E 60/521* (2013.01); *Y02T 10/7005* (2013.01); *Y02T 90/32* (2013.01)

(58) Field of Classification Search
CPC .. H01M 2300/0082; H01M 2008/1095; B60L 11/1883; B60L 11/1898; C25B 15/08; C25B 1/12; C25B 9/00; Y02E 60/521; Y02E 60/366; Y02T 90/32; Y02T 10/7005
USPC ........................................................ 429/422
See application file for complete search history.

(56) References Cited

FOREIGN PATENT DOCUMENTS

| | | |
|---|---|---|
| JP | 2013-197079 A | 9/2013 |
| JP | 5685748 B1 | 3/2015 |
| WO | 02/50338 A1 | 6/2002 |
| WO | 2013/137033 A1 | 9/2013 |

OTHER PUBLICATIONS

Feb. 1, 2017 International Preliminary Report on Patentability issued in International Patent Application No. PCT/JP2016/066121.

* cited by examiner

TANK-TYPE POWER GENERATION DEVICE CAPABLE OF MANUFACTURING HIGH-PRESSURE HYDROGEN AND FUEL CELL VEHICLE

TECHNICAL FIELD

The present invention relates to a tank-type power generation device capable of manufacturing high-pressure hydrogen and a fuel cell vehicle.

BACKGROUND ART

A conventional fuel cell vehicle travels while replenishing fuel cell hydrogen in a hydrogen station or the like instead of gasoline, light oil or the like. For such a conventional fuel cell vehicle, the present inventor has developed a high-pressure hydrogen tank capable of manufacturing hydrogen which is installed in a fuel cell vehicle so as to be able to manufacture high-pressure hydrogen within the vehicle and supply it to a fuel cell without the need for a hydrogen station (see, for example, patent literature 1).

Specifically, the high-pressure hydrogen tank capable of manufacturing hydrogen disclosed in patent literature 1 includes a tank main body which can store a high-pressure fluid therewithin, a partition member which partitions the interior of the tank main body into two sections, a water supply means, an electrolysis means and a control means. The tank main body includes a water supply port and a discharge port in one section, and includes an exhaust port in the other section. The partition member includes, in at least one part thereof, a solid polymer electrolyte membrane which is in contact with each of the sections, and includes a blockage means which blocks, when the internal pressure of the other section becomes higher than that of the one section, the discharge port by being operated by a pressure difference thereof. The water supply means is provided so as to be able to supply water from the water supply port to the one section at a predetermined pressure. The electrolysis means is provided such that it includes a positive pole on one of the surfaces of the solid polymer electrolyte membrane which is in contact with the one section, includes a negative pole on the surface which is in contact with the other section and can perform electrolysis by applying a voltage between the positive pole and the negative pole while supplying water to the one section with the water supply means so as to store hydrogen gas in the other section. The control means stops the electrolysis of the electrolysis means and the water supply of the water supply means when the internal pressure of the other section is increased to reach a set pressure that is previously determined.

CITATION LIST

Patent Literature

Patent Literature 1: Japanese Patent No. 5685748

SUMMARY OF INVENTION

Technical Problem

However, in the high-pressure hydrogen tank capable of manufacturing hydrogen disclosed in patent literature 1, it is necessary to use a platinum catalyst as the negative pole, and thus the high-pressure hydrogen tank is as expensive as the fuel cell. Hence, when the high-pressure hydrogen tank is installed in a fuel cell vehicle, the total cost of the high-pressure hydrogen tank and the fuel cell is at least about twice as expensive as the cost of the fuel cell alone, with the result that the manufacturing cost of the vehicle is disadvantageously increased.

The present invention is made by focusing on the problem described above, and an object of the present invention is to provide a tank-type power generation device capable of manufacturing high-pressure hydrogen which is installed in a fuel cell vehicle or the like so as to manufacture high-pressure hydrogen, which utilizes hydrogen so as to be able to generate power and which can reduce the manufacturing cost of the vehicle without the need for a separate fuel cell, and a fuel cell vehicle.

Solution to Problem

The present inventor improves the high-pressure hydrogen tank capable of manufacturing hydrogen disclosed in patent literature 1 so as to develop a device which can manufacture high-pressure hydrogen and which utilizes the hydrogen so as to be able to generate power, and finally achieves the present invention.

Specifically, a tank-type power generation device capable of manufacturing high-pressure hydrogen according to the present invention includes: a tank main body which can store a high-pressure fluid therewithin; a partition member which partitions the interior of the tank main body into two sections; a supply means; a switching means; a discharge pipe; a electrolytic power generation means; and a control means, where the tank main body includes a first opening and a second opening in one section, the one section is formed with an internal space of a flow path which is extended from the first opening and is circulated within the tank main body so as to reach the second opening, the other section is formed with an external space of the flow path within the tank main body, and the partition member is formed with an outer wall of the flow path, includes, in at least part thereof, a plurality of solid polymer electrolyte membranes which are in contact with the individual sections and includes a blockage means which is operated, when the internal pressure of the other section becomes higher than the internal pressure of the one section, by a pressure difference thereof so as to close the second opening, the supply means includes a supply pipe for supplying the water and the gas containing oxygen, and is provided so as to be able to supply water from the first opening to the one section at a predetermined pressure and to supply a gas containing oxygen from the second opening to the one section at a pressure higher than the internal pressure of the other section, and switches and supplies the water and the gas containing oxygen, when the water is supplied by the supply means, the switching means connects the supply pipe to the first opening and connects the discharge pipe to the second opening whereas when the gas containing oxygen is supplied by the supply means, the switching means connects the supply pipe to the second opening and connects the discharge pipe to the first opening, the flow path is arranged such that when the water is supplied by the supply means from the first opening, the water flows from down to up in positions of the solid polymer electrolyte membranes, the electrolytic power generation means includes electrodes on both surfaces of the solid polymer electrolyte membrane and is provided such that when the water is supplied by the supply means to the one section, the electrolytic power generation means can perform electrolysis by applying a voltage between the electrodes so as to store hydrogen gas in the other section and that when the gas containing oxygen is supplied by the supply means to the one section, the electrolytic power generation means can generate power by reacting the gas containing oxygen with the hydrogen gas in the other section and the control means stops the electrolysis of the electrolytic power generation means and the supply of the water by the supply means when the internal pressure of the other section is increased by the electrolysis of the electrolytic power generation means to reach a set pressure that is previously determined.

In the tank-type power generation device capable of manufacturing high-pressure hydrogen according to the present invention, the supply means switches the water and the gas containing oxygen so as to supply it to the one section, and thus the electrolytic power generation means can switch the electrolysis and the power generation to perform it. When the electrolysis is performed by the electrolytic power generation means, the principle of the high-pressure hydrogen tank capable of manufacturing hydrogen disclosed in patent literature 1 is utilized, and thus it is possible to store the hydrogen gas at the set pressure in the other section. When power is generated by the electrolytic power generation means, the oxygen in the gas supplied to the one section by the supply means is reacted with the hydrogen stored in the other section by the electrolysis, and thus it is possible to generate electricity and water.

As described above, in the tank-type power generation device capable of manufacturing high-pressure hydrogen according to the present invention, high-pressure hydrogen is manufactured at the time of the electrolysis, and the hydrogen can be utilized at the time of the power generation, with the result that only the tank-type power generation device capable of manufacturing high-pressure hydrogen can function both as the hydrogen manufacturing device and the fuel cell. Hence, the tank-type power generation device capable of manufacturing high-pressure hydrogen is installed in a fuel cell vehicle or the like so as to be able to travel by using the power generated by the electrolytic power generation means, and thus it is possible to reduce the manufacturing cost of the vehicle due to the absence of the need for a separate fuel cell.

In the tank-type power generation device capable of manufacturing high-pressure hydrogen according to the present invention, the pressure of the water supplied by the supply means and the set pressure of the control means are increased, and thus it is possible to obtain a higher pressure hydrogen gas. In order to make the control means function, the pressure of the water supplied by the supply means is preferably higher than the set pressure of the control means.

In the tank-type power generation device capable of manufacturing high-pressure hydrogen according to the present invention, the water supplied by the supply means to the one section is not limited to pure water, and may be tap water, river water, seawater or the like. The gas containing oxygen supplied by the supply means to the one section may be any gas as long as the gas contains oxygen, and may be oxygen gas consisting of only oxygen or air. The partition member may be partially formed of the solid polymer electrolyte membrane or the entire partition member may be formed of the solid polymer electrolyte membrane. The blockage means may have any configuration as long as the blockage means is operated by a pressure difference so as to block the second opening.

In the tank-type power generation device capable of manufacturing high-pressure hydrogen according to the present invention, the shape of the flow path, that is, the shape of the one section can be arbitrarily set. By devising the shape of the flow path, a plurality of solid polymer electrolyte membranes can be arranged with a gap left therebetween so as to be overlaid on each other. In this way, it is possible to increase the total surface area of the solid polymer electrolyte membranes, and thus it is possible to enhance the efficiency of the generation of the hydrogen gas by the electrolysis and by extension the efficiency of the power generation.

In the tank-type power generation device capable of manufacturing high-pressure hydrogen according to the present invention, at the time of the electrolysis, it is possible to reliably immerse the solid polymer electrolyte membranes in the water supplied by the supply means. At the time of the power generation, in the positions of the solid polymer electrolyte membranes, the water generated by the reaction of the oxygen and the hydrogen can be made to flow downward in the flow path along the flow of the gas containing oxygen supplied by the supply means. The gas containing oxygen can be supplied against the blockage means from the second opening.

In the tank-type power generation device capable of manufacturing high-pressure hydrogen according to the present invention, with the switching means, it is possible to easily switch the connection positions of the supply pipe and the discharge pipe.

In this case, the tank-type power generation device capable of manufacturing high-pressure hydrogen according to the present invention may include a turbine which is provided in the discharge pipe so as to be able to generate power with a liquid and/or a gas discharged from the discharge pipe. In this case, by the utilization of the flow of the discharged water after the electrolysis or the exhausted gas or the like after power generation, it is possible to generate power with the turbine, and thus it is possible to enhance the efficiency of the power generation of the device as a whole.

In the tank-type power generation device capable of manufacturing high-pressure hydrogen according to the present invention, the supply means may be provided so as to supply the gas containing oxygen to the one section at a pressure higher than 1 atmospheric pressure, and when the gas containing oxygen is supplied to the one section by the supply means, in a state where the hydrogen gas in the other section is kept at a pressure higher than 1 atmospheric pressure, the electrolytic power generation means may react the gas containing oxygen with the hydrogen gas to generate power. In this case, at the time of the power generation, the pressure within the tank main body is increased, and thus the boiling point of the water is increased, with the result that it is possible to generate power at a high temperature and thereby enhance the efficiency of the power generation.

The tank-type power generation device capable of manufacturing high-pressure hydrogen according to the present invention may be formed so as to include a hydrogen storage tank, where the tank main body includes an exhaust port in the other section, and the hydrogen storage tank is connected to the exhaust port so as to communicate with the other section, and can store the hydrogen gas stored in the other section by the electrolysis of the electrolytic power generation means and can supply the hydrogen gas stored to the other section. In this case, with the hydrogen storage tank, it is possible to increase the stored amount of high-pressure hydrogen gas generated by the electrolysis. Hence, the tank-type power generation device capable of manufacturing high-pressure hydrogen according to the present invention is installed in a fuel cell vehicle, and thus it is possible to increase the travel distance.

A fuel cell vehicle according to the present invention installs the tank-type power generation device capable of manufacturing high-pressure hydrogen according to the present invention, and can travel by the power generated by the electrolytic power generation means.

Since the fuel cell vehicle according to the present invention installs the tank-type power generation device capable of manufacturing high-pressure hydrogen according to the present invention, it is not necessary to perform operations such as the exchange of tanks and the filling of high-pressure hydrogen, and thus it is possible to manufacture high-pressure hydrogen within the tank main body and to travel by generating power by utilization of the hydrogen. Hence, it is not necessary to provide a separate fuel cell, and thus it is possible to reduce the manufacturing cost. While the fuel cell vehicle according to the present invention is charged at home, only a power supply and a water hose are required to be connected, and thus it is possible to manufacture high-pressure hydrogen inexpensively. Hence, a filling facility such as a hydrogen station is not necessary, and thus it is possible to reduce the supply cost of the high-pressure hydrogen.

Advantageous Effects of Invention

According to the present invention, it is possible to provide a tank-type power generation device capable of manufacturing high-pressure hydrogen that is installed in a fuel cell vehicle or the like so as to manufacture high-pressure hydrogen, which utilizes the hydrogen so as to be able to generate power and which can reduce the manufacturing cost of the vehicle without the need for a separate fuel cell, and a fuel cell vehicle.

DESCRIPTION OF EMBODIMENTS

An embodiment of the present invention will be described below with reference to the drawings.

Figure 1:
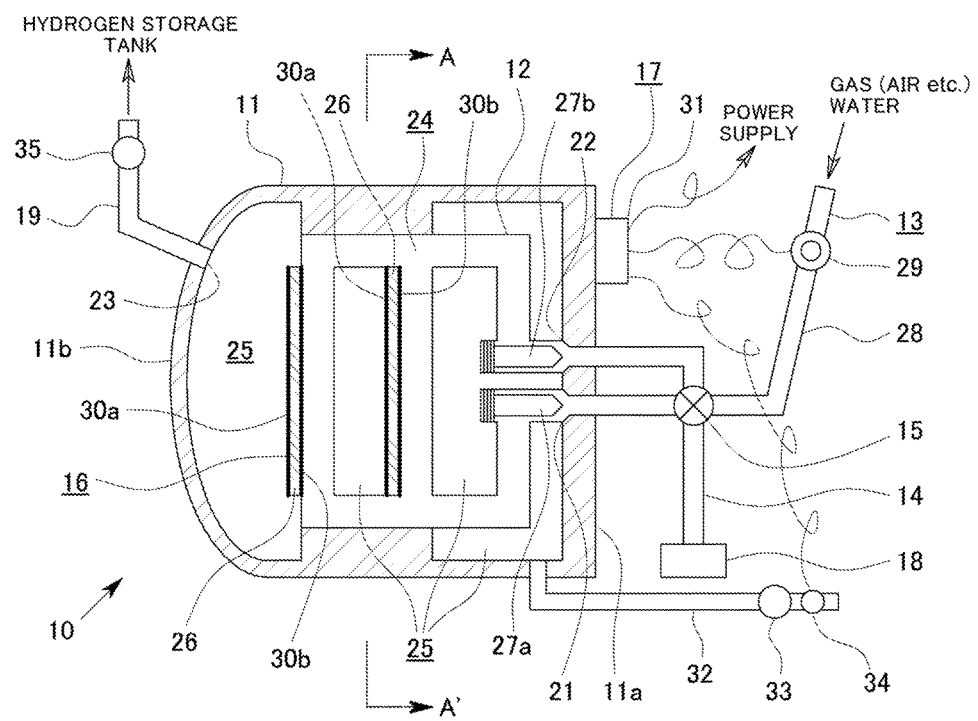
FIG. 1 is a vertical cross-sectional view showing a tank-type power generation device capable of manufacturing high-pressure hydrogen in an embodiment of the present invention.
Figure 2:
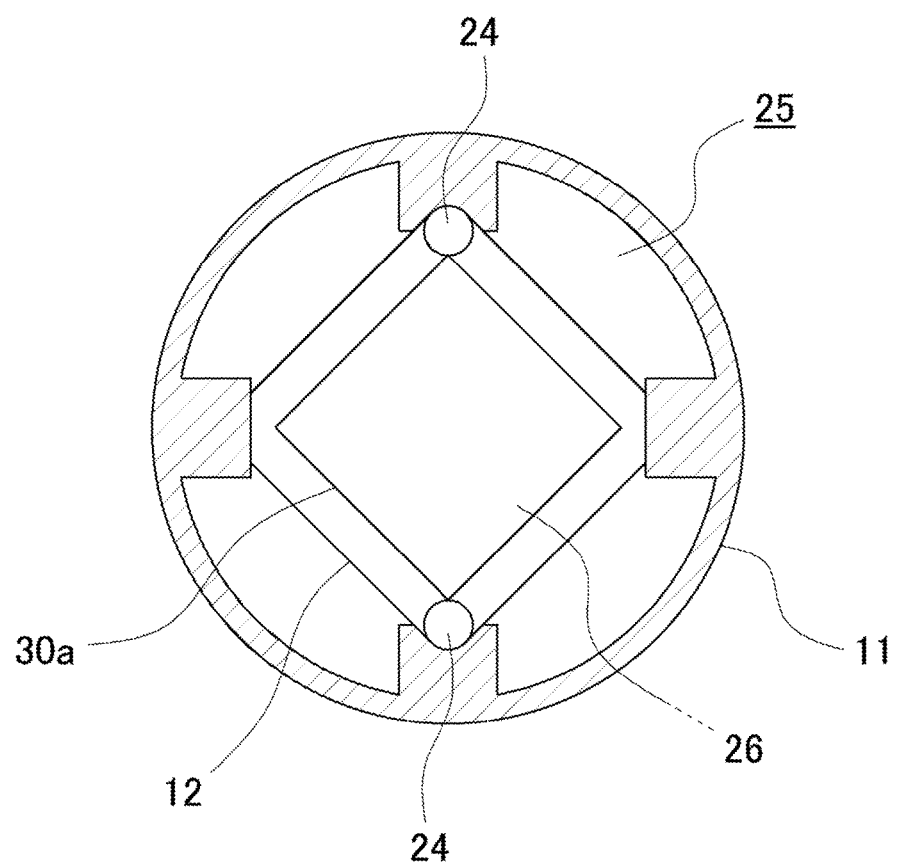
FIG. 2 is a cross-sectional view taken along line A-A' of a tank main body in the tank-type power generation device capable of manufacturing high-pressure hydrogen shown in FIG. 1.

FIGS. 1 and 2 show a tank-type power generation device capable of manufacturing high-pressure hydrogen in the embodiment of the present invention.

As shown in FIGS. 1 and 2, the tank-type power generation device capable of manufacturing high-pressure hydrogen 10 includes a tank main body 11, a partition member 12, a supply means 13, a discharge pipe 14, a switching means 15, an electrolytic power generation means 16, a control means 17, a turbine 18, an exhaust pipe 19 and a hydrogen storage tank (unillustrated).

The tank main body 11 is shaped such that an opening of a cylinder on one end side is covered with a flat plate lid 11a and that an opening on the other end side is covered with a dome-shaped lid 11b, and is formed so as to be able to store a high-pressure fluid therewithin. The tank main body is installed such that a cylindrical portion is directed laterally, a first opening 21 and a second opening 22 are provided in the flat plate lid 11a and an exhaust port 23 is provided in the dome-shaped lid 11b.

The partition member 12 is formed with the outer wall of a flow path which is extended from the first opening 21 and is circulated within the tank main body 11 so as to reach the second opening 22. The partition member 12 partitions the interior of the tank main body 11 into two sections which are one section 24 formed with the flow path and the other section 25 formed with an external space of the flow path within the tank main body 11. The flow path of the one section 24 is arranged such that the flow path is extended from the first opening 21 to an upper portion of the interior of the tank main body 11 and is branched into a plurality of flow paths in the upper portion, and that the branched paths are extended from up to down within the tank main body 11 so as to be spaced and are joined together again into one flow path in a lower portion of the interior of the tank main body 11 so as to reach the second opening 22. As shown in FIG. 2, in the flow path of the one section 24, the portion which is extended from up to down within the tank main body 11 is formed in the shape of a flat surface that is extended in a left/right direction within the tank main body 11. In a specific example shown in FIG. 2, the flat surface portion is rectangular and is formed in such a way that gaps are formed between the side edge thereof and the inner wall of the tank main body 11.

The partition member 12 includes a plurality of solid polymer electrolyte membranes 26 according to the individual branches of the flow path. Each of the solid polymer electrolyte membranes 26 is provided on one surface of a portion in the shape of a flat surface of each branch which is extended from up to down within the tank main body 11 so as to be in contact with the one section 24 (the flow path) and the other section 25 (the outside of the flow path). In the specific example shown in FIG. 1, two solid polymer electrolyte membranes 26 are provided. In the partition member 12, blockage means 27a and 27b are respectively provided in the connection positions of the first opening 21 and the second opening 22. The blockage means 27a and 27b are individually formed with a pressure adjustment valve, and when the internal pressure of the other section 25 (the outside of the flow path) becomes higher than that of the one section 24 (the flow path), the blockage means 27a and 27b are operated by a pressure difference thereof so as to respectively block the first opening 21 and the second opening 22.

The supply means 13 is formed so as to switch between water and a gas containing oxygen and to supply it, and includes a supply pipe 28 for supplying it. The supply means 13 includes a high-pressure pump 29 in the supply pipe 28 so as to be able to pressurize and then supply the water or the gas containing oxygen. The switching means 15 is formed with a flow path switching valve, and is connected to the supply pipe 28, the discharge pipe 14, the first opening 21 and the second opening 22. When the water is supplied by the supply means 13, the switching means 15 connects the supply pipe 28 to the first opening 21 and also connects the discharge pipe 14 to the second opening 22. When the gas containing oxygen is supplied by the supply means 13, the switching means 15 connects the supply pipe 28 to the second opening 22 and also connects the discharge pipe 14 to the first opening 21.

In this way, the supply means 13 can supply the water from the first opening 21 to the one section 24 at an arbitrary pressure, and can also supply the gas containing oxygen from the second opening 22 to the one section 24 at an arbitrary pressure. In this way, when the water is supplied by the supply means 13 from the first opening 21, the water flows from down to up in the positions of the solid polymer electrolyte membranes 26 whereas when the gas containing oxygen is supplied by the supply means 13 from the second opening 22, the gas flows from up to down in the positions of the solid polymer electrolyte membranes 26.

The electrolytic power generation means 16 includes electrodes 30a and 30b on both surfaces of the solid polymer electrolyte membrane 26. When the water is supplied by the supply means 13 to the one section 24, the electrolytic power generation means 16 applies a voltage between the electrodes 30a and 30b and thereby can perform electrolysis so as to store hydrogen gas in the other section 25. When the gas containing oxygen is supplied by the supply means 13 to the one section 24, the electrolytic power generation means 16 reacts the gas with the hydrogen gas in the other section 25 so as to be able to generate power. The electrode 30a on the side of the other section 25 is formed from a platinum electrode.

The control means 17 includes a controller 31 which is arranged on the outside surface of the flat plate lid 11a in the tank main body 11 and which has a power supply function, a measurement pipe 32 which communicates with the other section 25, a safety valve 33 which is attached to the measurement pipe 32 and a hydrogen gas sensor 34 which is attached on the downstream side with respect to the safety valve 33 of the measurement pipe 32. The controller 31 is connected to the electrodes 30a and 30b of the electrolytic power generation means 16, and can apply the voltage between the electrodes 30a and 30b according to the electrolysis and the power generation. The controller 31 is also connected to the high-pressure pump 29, and can supply power to the high-pressure pump 29.

When the pressure within the measurement pipe 32, that is, the internal pressure of the other section 25, is lower than a set pressure which is previously determined, the safety valve 33 closes the measurement pipe 32 whereas when the internal pressure of the other section 25 is increased by the electrolysis of the electrolytic power generation means 16 so as to reach the set pressure, the safety valve 33 opens the measurement pipe 32. The set pressure is set lower than the pressure of the water supplied by the supply means 13. When the measurement pipe 32 is opened by the safety valve 33, and the hydrogen gas sensor 34 detects the discharge of the hydrogen gas from the other section 25, the hydrogen gas sensor 34 transmits a detection signal to the controller 31.

When the control means 17 receives the detection signal from the hydrogen gas sensor 34, that is, when the internal pressure of the other section 25 is increased so as to reach the set pressure, the control means 17 stops power supply to the electrolytic power generation means 16 and the high-pressure pump 29 by the controller 31 so as to stop the electrolysis of the electrolytic power generation means 16 and the water supply of the supply means 13.

The turbine 18 is attached to the tip end of the discharge pipe 14 such that it is possible to generate power by the liquid and/or gas discharged from the discharge pipe 14. The exhaust pipe 19 is connected to the exhaust port 23 of the tank main body 11 so as to communicate with the other section 25. The exhaust pipe 19 includes a flow rate adjustment valve 35 which can adjust the direction of the flow of the gas flowing therewith and the flow rate thereof. The hydrogen storage tank is connected to the exhaust pipe 19 so as to communicate with the other section 25. By adjusting the flow rate adjustment valve 35, the hydrogen storage tank can store the hydrogen gas stored in the other section 25 by the electrolysis of the electrolytic power generation means 16, and can also supply the stored hydrogen gas to the other section 25.

Operation will now be described.

In the tank-type power generation device capable of manufacturing high-pressure hydrogen 10, the supply means 13 switches between the water and the gas containing oxygen so as to supply either to the one section 24, and thus the electrolytic power generation means 16 can switch between electrolysis and power generation and perform either. When the electrolysis is performed by the electrolytic power generation means 16, the electrolysis is first performed by the electrolytic power generation means 16 while the water is being supplied by the supply means 13 to the one section 24. Oxygen gas generated in this way is released to the one section 24, hydrogen ions are passed through the solid polymer electrolyte membranes 26 and are moved to the side of the other section 25 so as to form hydrogen gas and the hydrogen gas is released to the other section 25.

Although the hydrogen gas is gradually stored by the electrolysis in the other section 25 and the hydrogen storage tank such that the pressure is increased, since the supply means 13 supplies the water to the one section 24 at a pressure higher than the set pressure of the safety valve 33, while the water is supplied, the internal pressure of the one section 24 is higher than that of the other section 25, with the result that the second opening 22 is opened without being blocked. Hence, the oxygen gas released into the one section 24 and the water supplied are discharged from the second opening 22 to the outside. Even when the pressure of the hydrogen gas in the other section 25 is increased, current is passed continuously, and thus it is possible to manufacture the hydrogen gas by Faraday's law of electrolysis regardless of the pressure.

When the hydrogen gas is stored, and thus the internal pressure of the other section 25 and the hydrogen storage tank reaches the set pressure of the safety valve 33, the electrolysis of the electrolytic power generation means 16 and the water supply of the supply means 13 are stopped by the control means 17. In this way, the internal pressure of the one section 24 is lowered, and thus the internal pressure of the other section 25 becomes higher than that of the one section 24, with the result that the second opening 22 is blocked by the blockage means 27b. Thus, it is possible to prevent the backflow of the oxygen gas and the water discharged from the second opening 22. Since the safety valve 33 is opened, the hydrogen gas within the other section 25 is passed through the safety valve 33 so as to be exhausted. In this way, the internal pressure of the other section 25 is lowered beyond the set pressure, and thus the safety valve 33 is closed again, with the result that the other section 25 and the hydrogen storage tank are hermetically closed. Consequently, the hydrogen gas at the set pressure can be stored in the other section 25 and the hydrogen storage tank.

When power is generated by the electrolytic power generation means 16, the supply means 13 first supplies the gas containing oxygen to the one section 24. Here, the gas containing oxygen is supplied from the second opening 22 at a pressure higher than the internal pressure of the other section 25 such that the gas is supplied against the blockage means 27b to the one section 24. The oxygen in the gas supplied to the one section 24 is reacted with the hydrogen stored in the other section 25 by electrolysis, and thus current is passed between the electrodes 30a and 30b, with the result that electricity is generated. At the same time, the oxygen and the hydrogen combine with each other and generate water as well.

As described above, in the tank-type power generation device capable of manufacturing high-pressure hydrogen 10, high-pressure hydrogen is manufactured at the time of the electrolysis, and the hydrogen can be utilized at the time of the power generation, with the result that the tank-type power generation device alone is capable of manufacturing high-pressure hydrogen 10 can function both as the hydrogen manufacturing device and the fuel cell. Hence, the tank-type power generation device capable of manufacturing high-pressure hydrogen 10 is installed in a fuel cell vehicle or the like so as to be able to travel by using the power generated by the electrolytic power generation means 16, and thus it is possible to reduce the manufacturing cost of the vehicle without the need for a separate fuel cell. Preferably, when the power generation and the electrolysis are switched, the settings of the switching means 15, the electrolytic power generation means 16, the high-pressure pump 29 and the like are automatically switched by the control means 17.

In the tank-type power generation device capable of manufacturing high-pressure hydrogen 10, the pressure of the water supplied by the supply means 13 and the set pressure of the control means 17 are increased, and thus it is possible to obtain a higher pressure hydrogen gas. Since a plurality of solid polymer electrolyte membranes 26 are arranged with a gap left therebetween so as to be overlaid on each other, as compared with a case where one solid polymer electrolyte membrane 26 is provided, it is possible to increase the total surface area thereof, and thus it is possible to enhance the efficiency of the generation of the hydrogen gas by the electrolysis and by extension the efficiency of the power generation.

In the tank-type power generation device capable of manufacturing high-pressure hydrogen 10, at the time of the electrolysis, in the positions of the solid polymer electrolyte membranes 26, the water supplied by the supply means 13 flows from down to up, and thus it is possible to reliably immerse the solid polymer electrolyte membranes 26 in the water. At the time of the power generation, in the positions of the solid polymer electrolyte membranes 26, the gas supplied by the supply means 13 flows from up to down, and thus it is possible to make the water generated by the reaction of the oxygen and the hydrogen flow downward in the flow path along the flow of the gas supplied by the supply means 13.

In the tank-type power generation device capable of manufacturing high-pressure hydrogen 10, the pressures of the water or the gas containing oxygen supplied by the supply means 13 to the one section 24 is adjusted to be such a pressure as to open the pressure adjustment valves in the blockage means 27a and 27b, and thus the pressure and the pressure of the hydrogen gas stored in the other section 25 can be kept at substantially the same pressure, with the result that it is possible to prevent the solid polymer electrolyte membranes 26 from being broken.

In the tank-type power generation device capable of manufacturing high-pressure hydrogen 10, power can be generated with the turbine 18 provided in the discharge pipe 14 by the utilization of the flow of the discharged water after the electrolysis or the exhausted gas or the like after power generation, and thus it is possible to enhance the efficiency of the power generation of the device as a whole.

In the tank-type power generation device capable of manufacturing high-pressure hydrogen 10, by the utilization of the hydrogen storage tank, it is possible to increase the stored amount of high-pressure hydrogen gas generated by the electrolysis. Hence, the tank-type power generation device capable of manufacturing high-pressure hydrogen 10 is installed in a fuel cell vehicle, and thus it is possible to increase the travel distance. In a state where the flow rate adjustment valve 35 is closed, power is generated or the hydrogen gas is released through the safety valve 33, and thus it is possible to lower the pressure of the hydrogen gas in the other section 25. The pressure of the hydrogen gas in the other section 25 is lowered in this way, and thereafter power can be generated while the pressure of the hydrogen gas is kept constant by the flow rate adjustment valve 35. Here, it is possible to lower the pressure of the gas supplied by the supply means 13, and thus it is possible to lower the consumption energy of the high-pressure pump 29. By supplying a large amount of gas, it is also possible to prevent overheating during power generation.

The water supplied by the supply means 13 to the one section 24 in the tank-type power generation device capable of manufacturing high-pressure hydrogen 10 is not limited to pure water, and may be tap water, river water, seawater or the like. The gas containing oxygen supplied by the supply means 13 to the one section 24 may be any gas as long as the gas contains oxygen, and may be oxygen gas consisting of only oxygen or air.

In the tank-type power generation device capable of manufacturing high-pressure hydrogen 10, at the time of the power generation, the gas containing oxygen and the hydrogen gas may be reacted with each other at a pressure higher than 1 atmospheric pressure. Specifically, the gas containing oxygen is supplied by the supply means 13 to the one section 24 at a pressure higher than 1 atmospheric pressure, and in a state where the hydrogen gas in the other section 25 is kept at a pressure higher than 1 atmospheric pressure, the gas containing oxygen and the hydrogen gas are reacted with each other by the electrolytic power generation means 16, with the result that power may be generated. In this case, at the time of the power generation, the pressure within the tank main body 11 is increased, and thus the boiling point of the water is increased. For example, at 5 atmospheric pressure, even at 150° C., the water of the solid polymer electrolyte membrane 26 can be prevented from being vaporized. Hence, it is possible to generate power at a high temperature, and thus it is possible to enhance the efficiency of the power generation by the enhancement of ion conductivity. Here, the gas supplied by the supply means 13 is expanded by heat generation at the time of the power generation, and thus the turbine 18 of the discharge pipe 14 is efficiently rotated, with the result that it is possible to enhance the efficiency of the power generation.

In the tank-type power generation device capable of manufacturing high-pressure hydrogen 10, not only is the water supplied by the supply means 13 consumed by the electrolysis, but also the water supplied by the supply means 13 penetrates to the other section 25 by passing through the solid polymer electrolyte membranes 26 as hydrogen ions are moved. Hence, when tap water is used, in order to prevent a failure caused by the concentration of impurities in the tap water, it is preferable to supply several times as much water as necessary for the electrolysis. In order to discharge the water stored in a bottom portion of the other section 25, it is preferable to arrange the measurement pipe 32 such that the measurement pipe 32 is in contact with the bottom portion of the other section 25.

The tank-type power generation device capable of manufacturing high-pressure hydrogen 10 may be independently used or may be used by being installed in a fuel cell vehicle. When the tank-type power generation device capable of manufacturing high-pressure hydrogen 10 is installed in a fuel cell vehicle, it is not necessary to perform operations such as the exchange of tanks and the filling of high-pressure hydrogen, and it is possible to manufacture high-pressure hydrogen within the tank main body 11 and travel by generating power by utilization of the hydrogen. Hence, it is not necessary to provide a separate fuel cell, and thus it is possible to reduce the manufacturing cost. While the fuel cell vehicle is charged at home, only a power supply and a water hose are required to be connected, and thus it is possible to manufacture high-pressure hydrogen inexpensively and fill the fuel cell vehicle with the high-pressure hydrogen. Hence, a filling facility such as a hydrogen station is not necessary, and thus it is possible to reduce the supply cost of the high-pressure hydrogen.

REFERENCE SIGNS LIST

10: tank-type power generation device capable of manufacturing high-pressure hydrogen
11 tank main body
11a flat plate lid
11b dome-shaped lid
21 first opening
22 second opening
23 exhaust port
12 partition member
24 one section
25 other section
26 solid polymer electrolyte membrane
27a, 27b blockage means
13 supply means
28 supply pipe
29 high-pressure pump
14 discharge pipe
15 switching means
16 electrolytic power generation means
30a, 30b electrode
17 control means
31 controller
32 measurement pipe
33 safety valve
34 hydrogen gas sensor
18 turbine
19 exhaust pipe
35 flow rate adjustment valve

The invention claimed is:

1. A tank-type power generation device for manufacturing high-pressure hydrogen comprising: a tank main body which can store a high-pressure fluid therewithin; a partition member which partitions an interior of the tank main body into two sections; a supply means; a switching means; a discharge pipe; a electrolytic power generation means; and a control means, wherein the tank main body includes a first opening and a second opening in one section, the one section is formed with an internal space of a flow path which is extended from the first opening and is circulated within the tank main body so as to reach the second opening, and the other section is formed with an external space of the flow path within the tank main body, the partition member is formed with an outer wall of the flow path and includes, in at least part thereof, a plurality of solid polymer electrolyte membranes which are in contact with the individual sections and includes a blockage means which is operated, when an internal pressure of the other section becomes higher than an internal pressure of the one section, by a pressure difference thereof so as to close the second opening, the supply means includes a supply pipe for supplying the water and the gas containing oxygen, and is provided so as to be able to supply water from the first opening to the one section at a predetermined pressure and to supply a gas containing oxygen from the second opening to the one section at a pressure higher than the internal pressure of the other section, and switches between supplying the water and the gas containing oxygen, when the water is supplied by the supply means, the switching means connects the supply pipe to the first opening and connects the discharge pipe to the second opening whereas when the gas containing oxygen is supplied by the supply means, the switching means connects the supply pipe to the second opening and connects the discharge pipe to the first opening, the flow path is arranged such that when the water is supplied by the supply means from the first opening, the water flows from down to up in positions of the solid polymer electrolyte membranes, the electrolytic power generation means includes electrodes on both surfaces of the solid polymer electrolyte membrane and is provided such that when the water is supplied by the supply means to the one section, the electrolytic power generation means can perform electrolysis by applying a voltage between the electrodes so as to store hydrogen gas in the other section and that when the gas containing oxygen is supplied by the supply means to the one section, the electrolytic power generation means can generate power by reacting the gas containing oxygen with the hydrogen gas in the other section, and the control means stops the electrolysis of the electrolytic power generation means and the supply of the water by the supply means when the internal pressure of the other section is increased by the electrolysis of the electrolytic power generation means so as to reach a set pressure that is previously determined.

2. The tank-type power generation device capable of manufacturing high-pressure hydrogen according to claim 1, further comprising:
a turbine which is provided in the discharge pipe so as to be able to generate power with a liquid and/or a gas discharged from the discharge pipe.

3. The tank-type power generation device capable of manufacturing high-pressure hydrogen according to claim 1, wherein the supply means is provided so as to supply the gas containing oxygen to the one section at a pressure higher than 1 atmospheric pressure, and
when the gas containing oxygen is supplied to the one section by the supply means, in a state where the hydrogen gas in the other section is kept at a pressure higher than 1 atmospheric pressure, the electrolytic power generation means reacts the gas containing oxygen with the hydrogen gas so as to generate power.

4. The tank-type power generation device capable of manufacturing high-pressure hydrogen according to claim 1, further comprising:
a hydrogen storage tank,
wherein the tank main body includes an exhaust port in the other section, and
the hydrogen storage tank is connected to the exhaust port so as to communicate with the other section, and can store the hydrogen gas stored in the other section by the electrolysis of the electrolytic power generation means and can supply the hydrogen gas stored to the other section.

5. A fuel cell vehicle wherein the fuel cell vehicle installs the tank-type power generation device capable of manufacturing high-pressure hydrogen according to claim 1, and can travel by the power generated by the electrolytic power generation means.

\* \* \* \* \*